US012633628B2

(12) United States Patent
Heki

(10) Patent No.: US 12,633,628 B2
(45) Date of Patent: May 19, 2026

(54) BATTERY MODULE

(71) Applicant: SANYO Electric Co., Ltd., Osaka (JP)

(72) Inventor: Maito Heki, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 817 days.

(21) Appl. No.: 17/759,999

(22) PCT Filed: Oct. 20, 2020

(86) PCT No.: PCT/JP2020/039439
§ 371 (c)(1),
(2) Date: Aug. 2, 2022

(87) PCT Pub. No.: WO2021/161587
PCT Pub. Date: Aug. 19, 2021

(65) Prior Publication Data
US 2023/0067646 A1 Mar. 2, 2023

(30) Foreign Application Priority Data

Feb. 14, 2020 (JP) ................................. 2020-023782

(51) Int. Cl.
*H01M 50/572* (2021.01)
*H01M 50/505* (2021.01)

(52) U.S. Cl.
CPC ....... *H01M 50/572* (2021.01); *H01M 50/505* (2021.01)

(58) Field of Classification Search
CPC ............. H01M 50/572; H01M 50/505; H01M 50/264; H01M 50/291; H01M 50/507;
(Continued)

(56) References Cited

U.S. PATENT DOCUMENTS

2009/0061289 A1* 3/2009 Hamada .............. H01M 50/227
29/623.2
2010/0227205 A1* 9/2010 Byun .................. H01M 50/574
429/61
(Continued)

FOREIGN PATENT DOCUMENTS

CN 107039610 A 8/2017
JP 2014-082080 5/2014
(Continued)

OTHER PUBLICATIONS

International Search Report of PCT application No. PCT/JP2020/039439 dated Dec. 28, 2020.
(Continued)

*Primary Examiner* — Matthew T Martin
*Assistant Examiner* — Bartholomew A Hornsby
(74) *Attorney, Agent, or Firm* — WHDA, LLP

(57) ABSTRACT

Battery module includes: cell stack in which the plurality of cells each having output terminal are arrayed; bus bar that electrically connects output terminals of cells to each other, and bus bar plate that covers the surface of cell stack on which output terminal is disposed, that includes opening at a position overlapping with respective output terminals, bus bar plate in which bus bar is disposed in opening. When one of bus bar plate and cell stack is a first member and the other is a second member, the first member includes biasing part, and the second member includes biasing receiver. The first member and the second member are biased in opposite directions to each other by biasing part pressing the second member, and displacement of the first member and the second member is regulated by biasing receiver abutting on the first member.

2 Claims, 6 Drawing Sheets

(58) Field of Classification Search
    CPC ............. H01M 50/588; H01M 50/591; H01M
                                50/204; Y02E 60/10
    See application file for complete search history.

(56)                    References Cited

U.S. PATENT DOCUMENTS

| | | | | |
|---|---|---|---|---|
| 2011/0293986 A1* | 12/2011 | Kozu | ............... | H01M 10/6563 |
| | | | | 429/120 |
| 2012/0100401 A1* | 4/2012 | Yasui | ................. | H01M 50/512 |
| | | | | 429/7 |
| 2013/0273404 A1* | 10/2013 | Ochi | .................. | H01M 50/291 |
| | | | | 429/99 |
| 2014/0023893 A1 | 1/2014 | Shimizu et al. | | |
| 2015/0295214 A1 | 10/2015 | Cho et al. | | |
| 2017/0141371 A1* | 5/2017 | Toshioka | ............ | H01M 50/209 |
| 2017/0244139 A1* | 8/2017 | Tononishi | ............ | H01G 9/0029 |

FOREIGN PATENT DOCUMENTS

| | | | | |
|---|---|---|---|---|
| JP | 2015-133169 | 7/2015 | | |
| JP | 2015133169 A * | 7/2015 | .......... | H01M 10/613 |
| JP | 2017-091948 | 5/2017 | | |

OTHER PUBLICATIONS

Extended (Supplementary) European Search Report dated Jun. 12, 2024, issued in counterpart EP Application No. 20918974.5. (7 pages).
English Translation of Chinese Search Report dated Nov. 1, 2023, issued in counterpart CN Patent Application No. 202080094615.9. (3 pages).

* cited by examiner

BATTERY MODULE

TECHNICAL FIELD

The present invention relates to a battery module.

BACKGROUND ART

For example, as a power source for a vehicle or the like that requires a high output voltage, there has been known a battery module formed by electrically connecting a plurality of cells to each other. Regarding such power storage module, for example, PTL 1 discloses a power storage module including: a cell stack in which a plurality of cells are stacked; a bus bar that electrically connects output terminals of the respective cells to each other; and a surface plate (bus bar plate) that covers a surface of the cell stack on which the output terminal is disposed. This surface plate has an opening at a position opposing the output terminal, and the bus bar is held by being fitted into the opening.

CITATION LIST

Patent Literature

PTL 1: Unexamined Japanese Patent Publication No. 2015-133169

SUMMARY OF THE INVENTION

In general, in a conventional battery module, a positioning pin is provided in one of a cell stack and a bus bar plate, and a positioning hole is provided in the other, and the cell stack and the bus bar plate are positioned by the positioning pin being passed through the positioning hole. However, in this structure, positional deviation between the cell stack and the bus bar plate due to dimensions of each part and tolerance of positions easily occurs, and it is difficult to meet a demand for further enhancing positional accuracy of the cell stack and the bus bar plate.

The present disclosure has been made in view of such situation, and an object of the present disclosure is to provide a technique for improving positioning accuracy between a cell stack and a bus bar plate.

Solution to Problem

An aspect of the present disclosure is a battery module. This battery module includes: a cell stack in which a plurality of cells each having an output terminal are arrayed; a bus bar that electrically connects the output terminals of the plurality of cells to each other; and a bus bar plate that covers a surface of the cell stack on which the output terminal is disposed, that has an opening at a position overlapping with respective output terminals, the bus bar plate in which the bus bar is disposed in the opening. When one of the bus bar plate and the cell stack is a first member and the other is a second member, the first member has a biasing part, and the second member has a biasing receiver, and the first member and the second member are biased in opposite directions to each other by the biasing part pressing the second member, and displacement of the first member and the second member is regulated by the biasing receiver abutting on the first member.

Note that discretionary combinations of the above configuration elements and modified examples of the expressions of the present disclosure among methods, apparatuses, systems, and the like are also effective as aspects of the present disclosure.

Advantageous Effect of Invention

According to the present disclosure, it is possible to provide a technique for improving positioning accuracy between a cell stack and a bus bar plate.

BRIEF DESCRIPTION OF THE DRAWINGS

FIG. 4A is a plan view of a biasing part according to a first modified example. FIG. 4B is a plan view of a biasing part according to a second modified example.

DESCRIPTION OF EMBODIMENT

Figure 1:
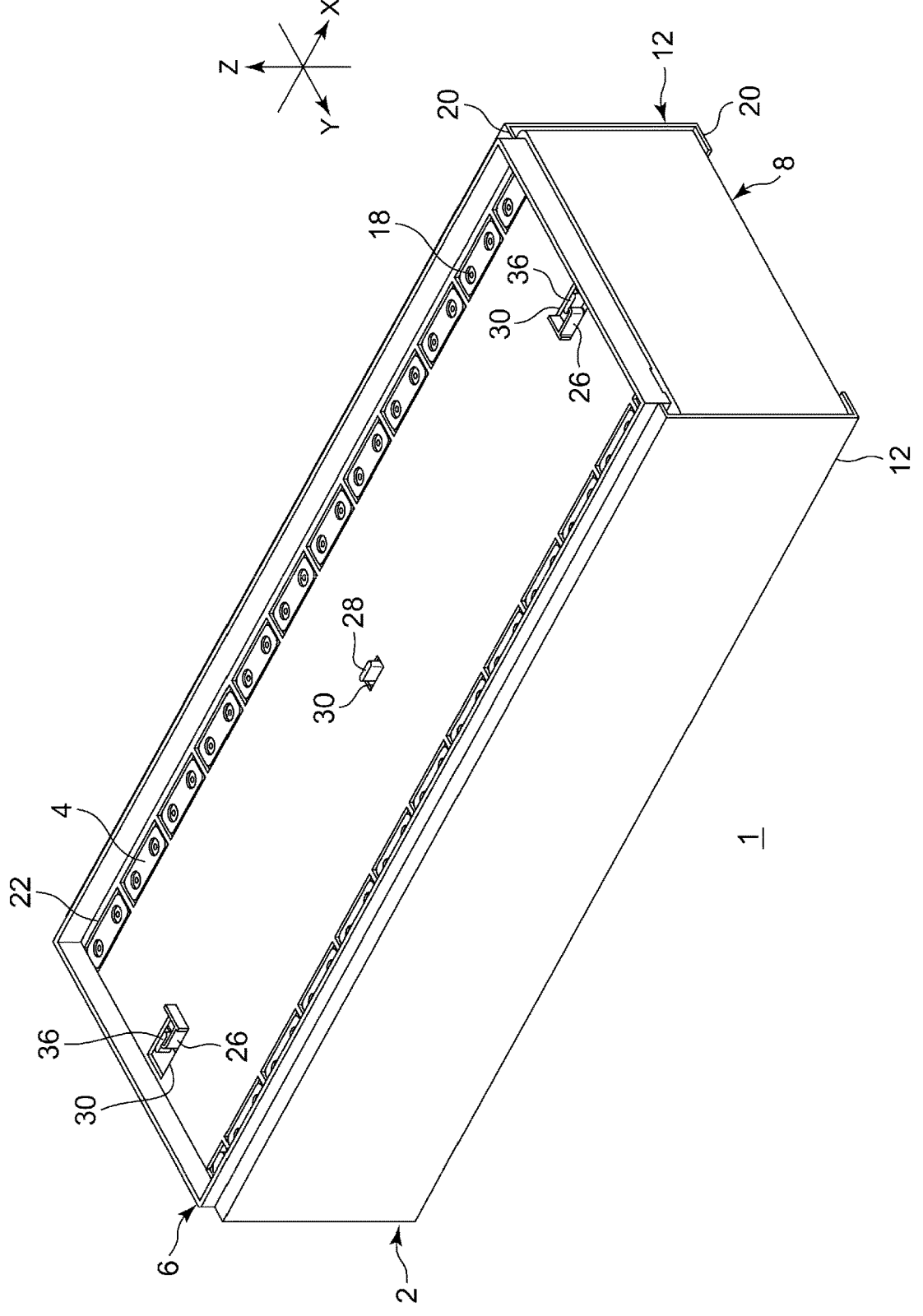
FIG. 1 is a perspective view of a battery module according to a first exemplary embodiment.

The present disclosure will hereinafter be described on the basis of preferred exemplary embodiments, with reference to the drawings. The exemplary embodiments are not intended to limit the present disclosure but are illustrative, and all features described in the exemplary embodiments and combinations of the features are not necessarily essential to the present disclosure. The identical or equivalent configuration elements, members, and processing illustrated in the drawings are denoted by the same reference numerals, and repetitious description will be omitted when appropriate. The scale and the shape of each part illustrated in each drawing are set for the sake of convenience in order to facilitate the understanding of the description and should not be interpreted in a limited manner unless otherwise specified. In cases where terms such as "first" and "second" are used in the present description or claims, these terms do not represent any order or importance but are intended to distinguish one configuration from another configuration, unless otherwise specified. From each of the drawings, some of members not important for describing the exemplary embodiments are omitted.

First Exemplary Embodiment

Figure 2:
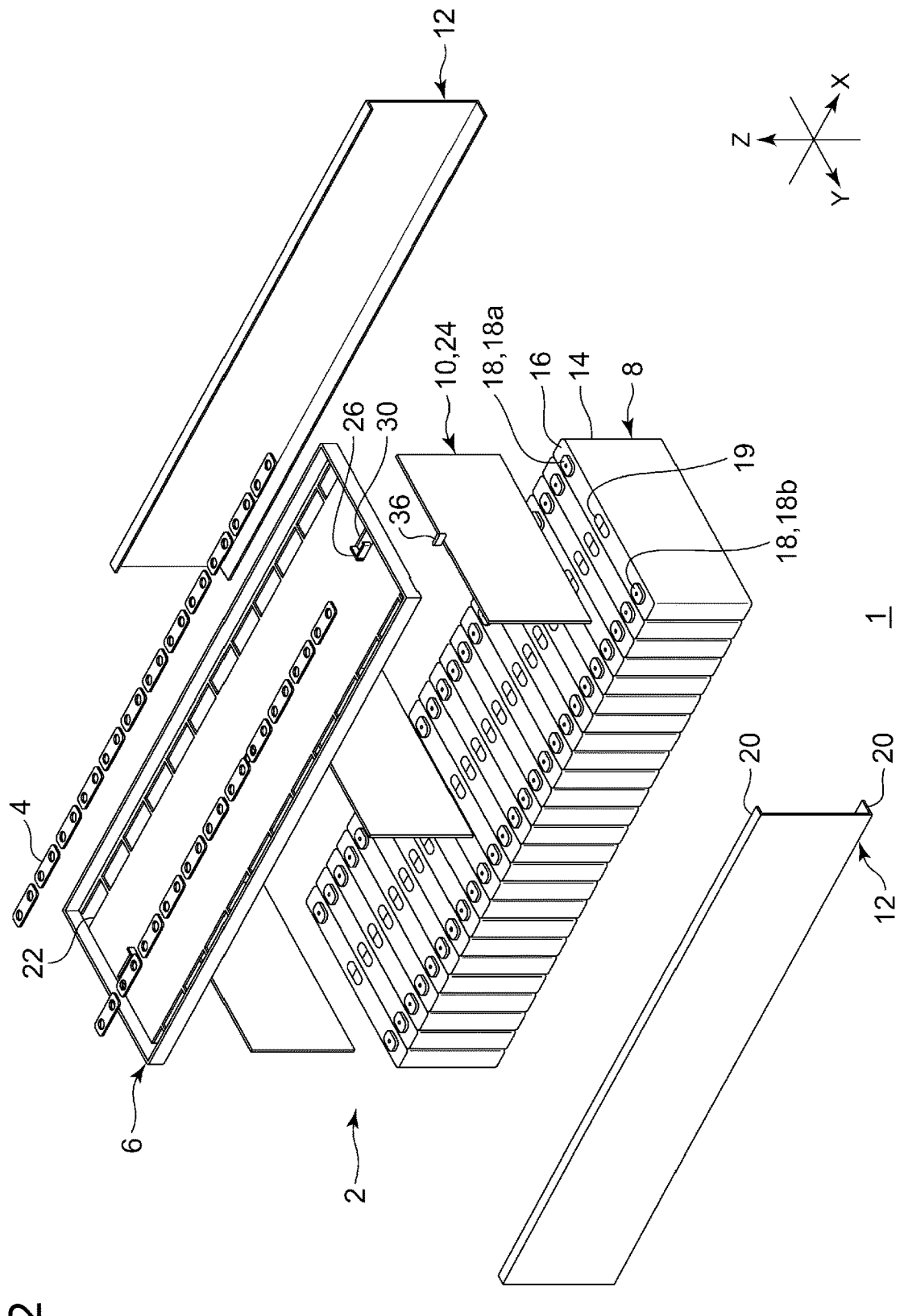
FIG. 2 is an exploded perspective view of the battery module.

FIG. 1 is a perspective view of the battery module according to the first exemplary embodiment. FIG. 2 is an exploded perspective view of the battery module. Battery module 1 includes cell stack 2, a plurality of bus bars 4, and bus bar plate 6.

Cell stack 2 has a structure in which a plurality of cells 8 are arrayed. Cell stack 2 includes the plurality of cells 8, a plurality of separators 10, and a pair of binding members 12.

Each cell 8 is a rechargeable secondary cell such as a lithium-ion cell, a nickel-metal-hydride cell, or a nickel-cadmium cell. Each cell 8 is a so-called prismatic cell, and includes outer covering can 14 having a flat rectangular-parallelepiped shape. One surface of outer covering can 14 is provided with an opening having a substantially rectangular shape not illustrated, and an electrode body, an electrolyte, and the like are accommodated in outer covering can 14 through the opening. A substantially rectangular sealing plate 16 for closing the opening is fitted into the opening of outer covering can 14.

A pair of output terminals 18 are disposed on sealing plate 16. Specifically, positive-electrode terminal 18a is disposed near one end in the long direction, and negative-electrode terminal 18b is disposed near the other end. Hereinafter, when it is not necessary to distinguish the polarities of the pair of output terminals 18, positive-electrode terminal 18a and negative-electrode terminal 18b are collectively referred to as output terminal 18.

Outer covering can 14, sealing plate 16, and output terminal 18 are conductors, and are made of metal such as aluminum, iron, or stainless steel, for example. Outer covering can 14 and sealing plate 16 are joined to each other by, for example, laser welding. Each output terminal 18 is inserted into a through-hole formed in sealing plate 16. An insulating seal member is interposed between respective output terminals 18 and respective through-holes. Outer covering can 14 may be covered with an insulating film not illustrated such as a shrink tube.

Cell 8 has valve 19 on sealing plate 16. Valve 19 is disposed between the pair of output terminals 18 in sealing plate 16. Valve 19 is configured to be opened when the internal pressure of cell 8 rises to equal to or greater than a predetermined value to release the gas inside cell 8. For example, valve 19 includes a thin part having a thickness smaller than a thickness of another part provided in a part of sealing plate 16, and a linear groove formed on the surface of this thin part. In this configuration, when the internal pressure of cell 8 rises, the thin part tears from the groove as a starting point, so that valve 19 opens.

In the description of the present exemplary embodiment, for convenience, sealing plate 16 is an upper surface of cell 8, and a bottom surface of outer covering can 14 opposing sealing plate 16 is a lower surface of cell 8. Cell 8 has four side surfaces connecting the upper surface and the lower surface. Two of the four side surfaces are a pair of long side surfaces connected to two opposing long sides of sealing plate 16. Each long side surface is a surface having the largest area among surfaces of cell 8, that is, a main surface. The remaining two side surfaces excluding the two long side surfaces are a pair of short side surfaces connected to the short side of sealing plate 16. For convenience, in cell stack 2, a surface on an upper surface side of cell 8 is defined as an upper surface of cell stack 2, a surface on a lower surface side of cell 8 is defined as a lower surface of cell stack 2, and a surface on a short side surface side of cell 8 is defined as a side surface of cell stack 2. These directions and positions are defined for convenience. Therefore, for example, the part defined as the upper surface in the present disclosure does not mean that the part defined as the lower surface is always positioned above the part defined as the lower surface.

The plurality of cells 8 are arrayed at predetermined intervals such that main surfaces of adjacent cells 8 oppose each other. In the present exemplary embodiment, cells 8 are arrayed in the horizontal direction. Hereinafter, a direction in which cells 8 are arrayed is appropriately defined as array direction X, a direction that is horizontal and orthogonal to array direction X is defined as horizontal direction Y, and a direction orthogonal to array direction X and horizontal direction Y is defined as vertical direction Z.

Each cell 8 is disposed such that output terminal 18 faces the same direction. Each cell 8 of the present exemplary embodiment is disposed such that output terminal 18 faces upward in the vertical direction. When adjacent cells 8 are connected in series, cells 8 are arrayed such that positive-electrode terminal 18a of one cell 8 and negative-electrode terminal 18b of other cell 8 are adjacent to each other. When adjacent cells 8 are connected in parallel, positive-electrode terminal 18a of one cell 8 and positive-electrode terminal 18a of other cell 8 are arrayed adjacent to each other.

Separator 10 is disposed between two adjacent cells 8. Accordingly, two cells 8 are electrically insulated from each other. Separator 10 is also called an insulating spacer, and is made of, for example, an insulating resin sheet. Examples of the resin constituting separator 10 include resins such as polypropylene (PP), polybutylene terephthalate (PBT), polycarbonate (PC), and Noryl (registered trademark) resin (modified PPE). FIG. 2 only illustrates some separators 10.

The plurality of cells 8 are bound in array direction X by the pair of binding members 12 extending in array direction X of cells 8. Binding member 12 is also called a bind bar, and is a long member that is long in array direction X of cells 8. In the present exemplary embodiment, the pair of binding members 12 are arrayed in horizontal direction Y. Each binding member 12 is made of metal such as iron or stainless steel, for example.

For example, the plurality of cells 8 are held between a pair of end plates not illustrated in array direction X in a state of being alternately arrayed with the plurality of separators 10. The pair of end plates are adjacent across separator 10 to cells 8 positioned at both ends in stacking direction X. The pair of binding members 12 are arranged so as to hold the plurality of cells 8, the plurality of separators 10, and the pair of end plates in horizontal direction Y, and both ends of each binding member 12 are fixed to the pair of end plates. For example, binding member 12 has, at both ends in array direction X, a bent part overlapping the main surface of the end plate, and this bent part is fixed to the end plate by screwing or the like.

The plurality of cells 8 are bound in array direction X by the pair of binding members 12 and positioned in array direction X. Each binding member 12 has a pair of arms 20 opposing each other in vertical direction Z. The plurality of cells 8 are held in vertical direction Z by the pair of arms 20. Thus, each cell 8 is positioned in vertical direction Z.

Bus bar 4 is a substantially belt-shaped member made of metal such as copper or aluminum. One end of bus bar 4 is connected to positive-electrode terminal 18a of one cell 8 of two adjacent cells 8, and the other end is connected to negative-electrode terminal 18b of other cell 8. Consequently, output terminals 18 of cells 8 are electrically connected to each other. In bus bar 4, output terminals 18 having the same polarity in the plurality of adjacent cells 8 may be connected in parallel to form a cell block, and the cell blocks may be connected in series.

Bus bar plate 6 is a plate-shaped member that covers an upper surface of cell stack 2 on which output terminal 18 is disposed. Bus bar plate 6 can also function as a part of a holder case that accommodates cell stack 2. Bus bar plate 6 is made of resin such as polypropylene (PP), polybutylene terephthalate (PBT), polycarbonate (PC), and Noryl (registered trademark) resin (modified PPE).

Bus bar plate 6 has a plurality of openings 22 through which respective output terminals 18 are exposed at positions overlapping respective output terminals 18 of the plurality of cells 8 in vertical direction Z. Bus bar 4 is disposed in each opening 22. For example, bus bar plate 6 is placed on an upper surface of cell stack 2, and then bus bar 4 is fitted into each opening 22. Alternatively, bus bar 4 is fitted into each opening 22 of bus bar plate 6, and bus bar plate 6 in a state of holding the plurality of bus bars 4 is placed on the upper surface of cell stack 2. The plurality of bus bars 4 are positioned with respect to cell stack 2 by bus bar plate 6.

In a state where bus bar plate 6 is placed on the upper surface of cell stack 2 and bus bar 4 is disposed in opening 22, output terminal 18 and bus bar 4 abut each other. In this state, output terminal 18 and bus bar 4 are joined to each other by laser welding or the like. As a result, output terminals 18 of the plurality of cells 8 are electrically connected to each other.

Bus bar plate 6 is fixed to, for example, the end plate by screwing or the like in a state of being positioned with respect to cell stack 2. A cover plate not illustrated is placed on an upper surface of bus bar plate 6. By covering the upper surface of bus bar plate 6 with the cover plate, it is possible to suppress contact of dew condensation water, dust, or the like with output terminal 18, bus bar 4, or the like.

When one of bus bar plate 6 and cell stack 2 is a first member and the other is a second member, the first member has biasing part 26, and the second member has biasing receiver 28. In the present exemplary embodiment, bus bar plate 6 is the first member, and cell stack 2 is the second member. Note that bus bar plate 6 may be the second member, and cell stack 2 may be the first member. That is, bus bar plate 6 may be provided with biasing receiver 28, and cell stack 2 may be provided with biasing part 26.

Figure 3A:
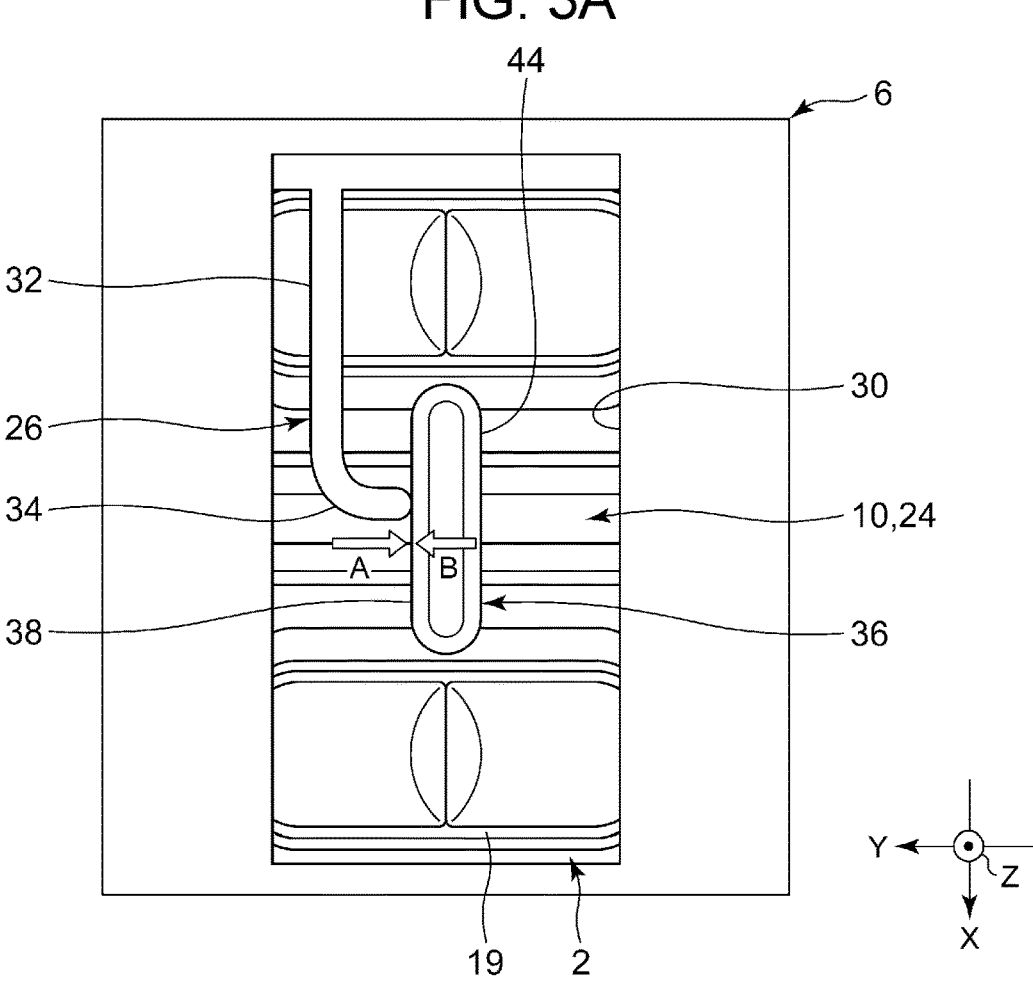
FIG. 3A is an enlarged plan view illustrating a region including a biasing part in the battery module.
Figure 3B:
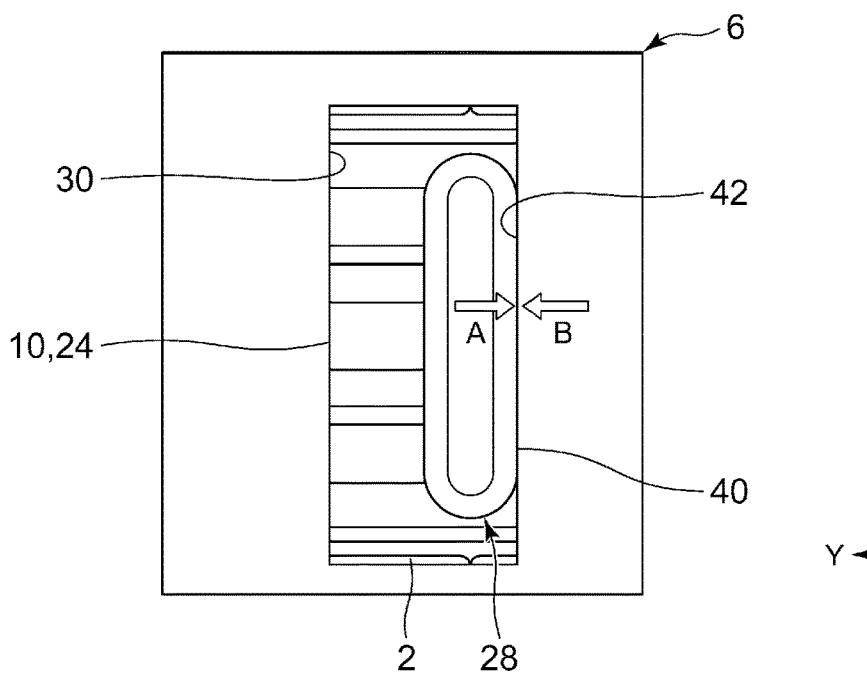
FIG. 3B is an enlarged plan view illustrating a region including a biasing receiver in the battery module.
Figure 3B:
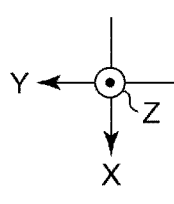

FIG. 3A is an enlarged plan view illustrating a region including biasing part 26 in battery module 1. FIG. 3B is an enlarged plan view illustrating a region including biasing receiver 28 in battery module 1.

Biasing part 26 has an elastically deformable shape, and presses cell stack 2 as the second member by its elastic force in a state where bus bar plate 6 is placed on cell stack 2. In the present exemplary embodiment, biasing part 26 presses separator 10. Therefore, separator 10 is mating member 24 that is a direct biasing target of bus bar plate 6. When biasing part 26 presses separator 10, bus bar plate 6 as the first member and cell stack 2 as the second member are biased in opposite directions to each other.

Specifically, when biasing part 26 presses separator 10 in first direction A, cell stack 2 including separator 10 is biased in first direction A. On the other hand, bus bar plate 6 including biasing part 26 is biased in second direction B opposite to first direction A by reaction force from separator 10. In the present exemplary embodiment, first direction A and second direction B are parallel to horizontal direction Y.

In a state where bus bar plate 6 and cell stack 2 are biased in opposite directions, biasing receiver 28 abuts on bus bar plate 6. This regulates displacement of bus bar plate 6 and cell stack 2. The elastic deformation amount of biasing part 26 and the positional relationship between biasing part 26 and biasing receiver 28 in horizontal direction Y are determined such that the first member abuts on biasing receiver 28 in a state where biasing force (pressing force) of biasing part 26 is applied to the second member.

Bus bar plate 6 of the present exemplary embodiment has three openings 30 at the center in horizontal direction Y. Each opening 30 has a rectangular shape and has a pair of edges extending in array direction X and a pair of edges extending in horizontal direction Y. Two openings 30 are arranged at both ends in array direction X. Biasing part 26 is disposed in two openings 30. Biasing part 26 has a leaf spring shape as an example. More specifically, biasing part

26 includes: arm 32 that extends along the upper surface of cell stack 2 from an edge that extends in horizontal direction Y of opening 30 toward the center in array direction X; and tip end 34 that is bent in first direction A from the tip end of arm 32 and extends. Tip end 34 can be displaced in first direction A and second direction B by arm 32 bending with the base end in contact with the edge of opening 30 as a fulcrum.

Separator 10 has projection 36 to be pressed by biasing part 26. Projection 36 protrudes from opening 30 where biasing part 26 is disposed toward bus bar plate 6 in vertical direction Z. Projection 36 has a flat plate shape extending in array direction X and vertical direction Z, and has pressing surface 38 opposing tip end 34. When tip end 34 presses pressing surface 38 in first direction A due to elastic deformation of arm 32, separator 10 and eventually cell stack 2 are biased in first direction A. Biasing part 26 and eventually bus bar plate 6 are biased in second direction B by the reaction force in second direction B from pressing surface 38.

Remaining one opening 30 is disposed at the center in array direction X. Biasing receiver 28 protrudes in vertical direction Z from opening 30. Biasing receiver 28 has a shape similar to that of projection 36 and has plane 40 facing first direction A. Plane 40 abuts on bus bar plate 6 to regulate displacement of bus bar plate 6 in second direction B and displacement of cell stack 2 in first direction A. Bus bar plate 6 has straight line 42 facing in second direction B and extending in parallel with plane 40, and straight line 42 abuts on plane 40. Straight line 42 of the present exemplary embodiment is an edge extending in array direction X in opening 30.

Note that projection 36 may include a function as biasing receiver 28. That is, the shape and arrangement of biasing part 26 and projection 36 are set such that the distance between tip end 34 when biasing part 26 is not in a state of being elastically deformed and the edge of opening 30 opposing tip end 34 becomes shorter than the dimension of projection 36 in horizontal direction Y. As a result, when tip end 34 presses pressing surface 38, surface 44 of projection 36 on the side opposite to pressing surface 38 abuts on the edge of opening 30, and projection 36 is held between biasing part 26 and the edge of opening 30. As a result, cell stack 2 is biased in first direction A by biasing part 26, and bus bar plate 6 is biased in second direction B by the reaction force. Projection 36 abuts on the edge of opening 30 to regulate displacement of bus bar plate 6 and cell stack 2.

Figures 4A, 4B:
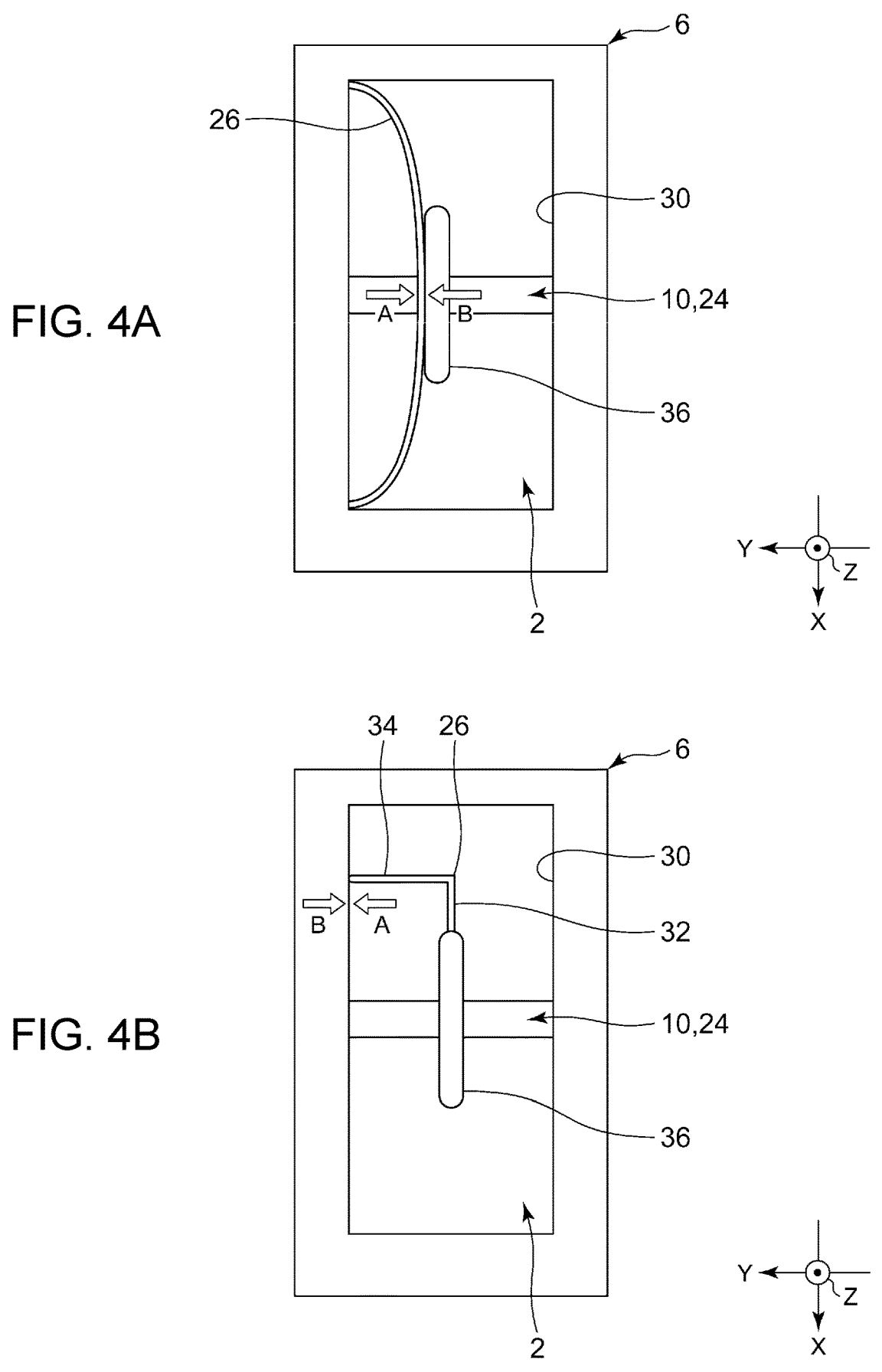

Biasing part 26 is only required to have a shape that can be elastically deformed in horizontal direction Y (first direction A and second direction B). For example, biasing part 26 can include the shape as in the modified example below. FIG. 4A is a plan view of biasing part 26 according to modified example 1. As illustrated in FIG. 4A, biasing part 26 according to modified example 1 is a leaf spring having a curved shape protruding in first direction A from the edge extending in array direction X of opening 30. When the top of biasing part 26 presses projection 36 in first direction A, cell stack 2 is biased in first direction A. On the other hand, bus bar plate 6 is biased in second direction B by the reaction force in second direction B from projection 36.

FIG. 4B is a plan view of biasing part 26 according to modified example 2. Modified example 2 is a modified example of biasing part 26 in a case where bus bar plate 6 is the second member and cell stack 2 is the first member. In the present modified example, biasing part 26 is provided on projection 36.

FIG. 4(B) is a plan view of biasing part 26 according to modified example 2. Modified example 2 is a modified example of biasing part 26 in a case where bus bar plate 6 is the second member and cell stack 2 is the first member. In the present modified example, biasing part 26 is provided on projection 36.

Biasing part 26 according to modified example 2 has an approximately L shape, and includes arm 32 extending in array direction X and tip end 34 extending in horizontal direction Y. One end of arm 32 is connected to projection 36, and the other end of arm 32 is connected to one end of tip end 34. The other end of tip end 34 abuts on the edge extending in array direction X of opening 30. When arm 32 is elastically deformed, tip end 34 is displaced in horizontal direction Y. Tip end 34 presses the edge of opening 30 in first direction A, whereby bus bar plate 6 is biased in first direction A. On the other hand, cell stack 2 is biased in second direction B by the reaction force in second direction B from bus bar plate 6.

As another modified example, biasing part 26 may have a shape extending linearly from a corner of opening 30 toward projection 36. Biasing part 26 may have a circular shape or a bellows shape when viewed in vertical direction Z, or may be a coil spring or the like. In this case, biasing part 26 is held between projection 36 and the edge extending in array direction X of opening 30. Biasing part 26 having a curved shape, a linear shape, a circular shape, a bellows shape, or a coil spring shape may be provided on either bus bar plate 6 or cell stack 2.

As described above, battery module 1 according to the present exemplary embodiment includes: cell stack 2 in which the plurality of cells 8 each having output terminal 18 are arrayed; bus bar 4 that electrically connects output terminals 18 of cells 8 to each other, and bus bar plate 6 that covers the surface of cell stack 2 on which output terminal 18 is disposed, that has opening 22 at a position overlapping with respective output terminals 18, bus bar plate 6 in which bus bar 4 is disposed in opening 22. When one of bus bar plate 6 and cell stack 2 is a first member and the other is a second member, the first member has biasing part 26, and the second member has biasing receiver 28. The first member and the second member are biased in opposite directions to each other by biasing part 26 pressing the second member, and displacement of the first member and the second member is regulated by biasing receiver 28 abutting on the first member.

Thus, by regulating the position of bus bar plate 6 with respect to cell stack 2 by the biasing force of biasing part 26, it is possible to suppress the positional deviation between cell stack 2 and bus bar plate 6 due to dimensions of each part and tolerance of positions, and it is possible to further enhance positional accuracy of cell stack 2 and bus bar plate 6. As a result, more accurate welding between bus bar 4 and output terminal 18 can be achieved, and the quality of battery module 1 can be improved.

Cell stack 2 of the present exemplary embodiment includes separator 10 disposed between two adjacent cells 8 to electrically insulate two cells 8 from each other, and biasing part 26 presses separator 10. Accordingly, it is possible to enhance positional accuracy between cell stack 2 and bus bar plate 6 without providing a separate member for positioning bus bar plate 6 with respect to cell stack 2.

The second member of the present exemplary embodiment has projection 36 to be pressed by biasing part 26. Thus, by providing projection 36 dedicated to receiving the biasing force from biasing part 26, it is possible to apply the biasing force of biasing part 26 to the second member more reliably. The magnitude of the biasing force can be more easily adjusted.

Biasing receiver 28 of the present exemplary embodiment has plane 40, and plane 40 abuts on the first member to regulate displacement of the first member and the second member. This makes it possible to further enhance the positional accuracy of bus bar plate 6.

In the present exemplary embodiment, two biasing parts 26 are arranged so as to hold biasing receiver 28 in array direction X. This makes it possible to position bus bar plate 6 more stably. Also when two biasing receivers 28 are arranged so as to hold biasing part 26 in array direction X, similarly bus bar plate 6 can be positioned stably.

Second Exemplary Embodiment

The second exemplary embodiment has a common configuration to the configuration of the first exemplary embodiment except that the pressing target of biasing part 26 is different.

Figure 5:
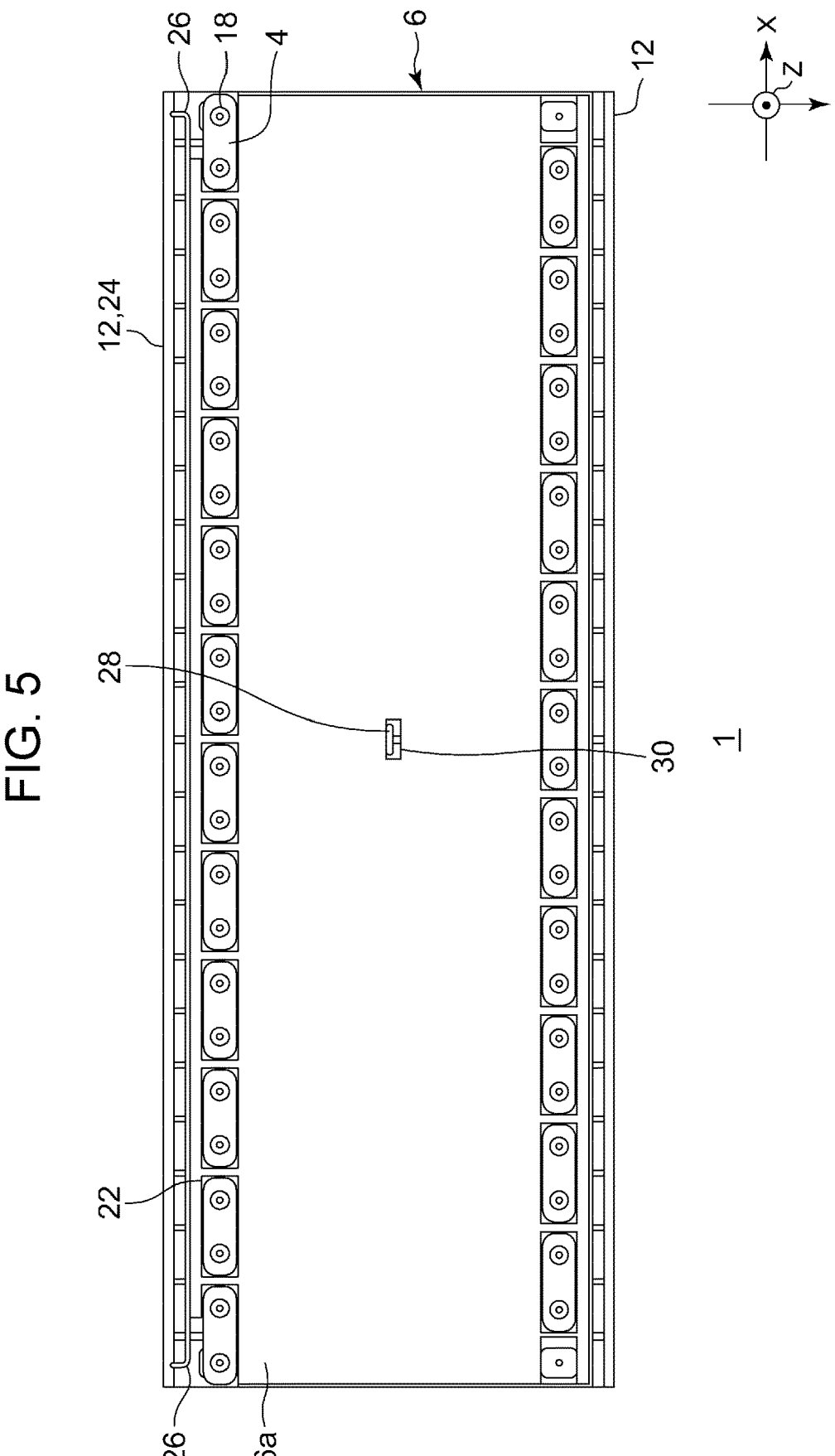
FIG. 5 is a plan view of a battery module according to a second exemplary embodiment.
Figure 6A:
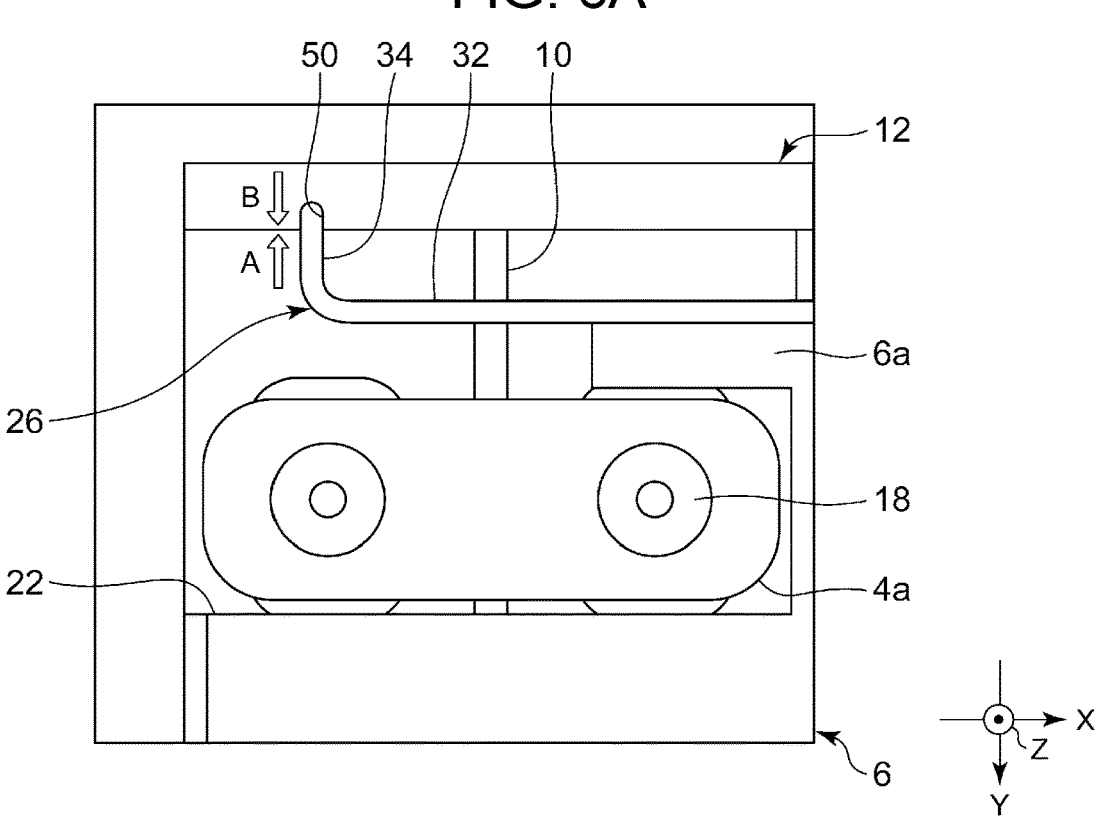
FIG. 6A is an enlarged plan view illustrating a region including a biasing part in the battery module.
Figure 6B:
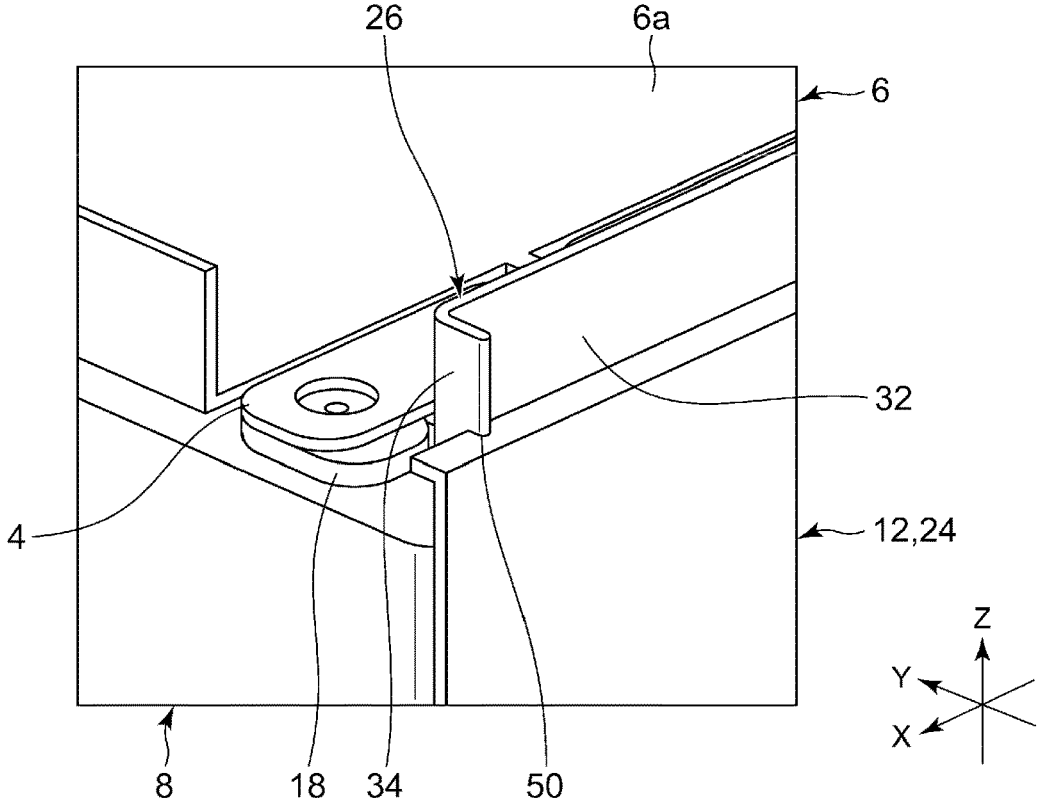
FIG. 6B is an enlarged perspective view illustrating a region including the biasing part in the battery module.

Hereinafter, the present exemplary embodiment will be described with focus placed on configurations different from those of the first exemplary embodiment, and the same configurations will be briefly described or not described. FIG. 5 is a plan view of battery module 1 according to the second exemplary embodiment. FIG. 6A is an enlarged plan view illustrating a region including biasing part 26 in battery module 1. FIG. 6B is an enlarged perspective view illustrating a region including biasing part 26 in battery module 1.

When one of bus bar plate 6 and cell stack 2 is a first member and the other is a second member, the first member has biasing part 26, and the second member has biasing receiver 28. In the present exemplary embodiment, bus bar plate 6 is the first member, and cell stack 2 is the second member. Note that bus bar plate 6 may be the second member, and cell stack 2 may be the first member.

Biasing part 26 has an elastically deformable shape, and presses cell stack 2 as the second member by its elastic force in a state where bus bar plate 6 is placed on cell stack 2. In the present exemplary embodiment, biasing part 26 presses one of the pair of binding members 12. Therefore, binding member 12 is mating member 24 that is a direct biasing target of bus bar plate 6. By designing biasing part 26 to press binding member 12, it is possible to enhance positional accuracy between cell stack 2 and bus bar plate 6 without providing a separate member for positioning bus bar plate 6. When biasing part 26 presses binding member 12, bus bar plate 6 as the first member and cell stack 2 as the second member are biased in opposite directions to each other.

Specifically, when biasing part 26 presses binding member 12 in first direction A, cell stack 2 including binding member 12 is biased in first direction A. On the other hand, bus bar plate 6 including biasing part 26 is biased in second direction B opposite to first direction A by reaction force from binding member 12. In the present exemplary embodiment, first direction A and second direction B are parallel to horizontal direction Y. In a state where bus bar plate 6 and cell stack 2 are biased in opposite directions, biasing receiver 28 abuts on bus bar plate 6. This regulates displacement of bus bar plate 6 and cell stack 2.

Bus bar plate 6 of the present exemplary embodiment has biasing parts 26 at both ends in array direction X on one end in horizontal direction Y. Biasing part 26 is a leaf spring having arm 32 extending in array direction X along the upper surface of cell stack 2 from a corner of body 6a of bus bar plate 6, and tip end 34 bent in first direction A from the tip end of arm 32 and extending toward binding member 12. Body 6a is a flat plate shaped part that expands in array direction X and horizontal direction Y and covers the upper surface of cell stack 2. Tip end 34 can be displaced in first direction A and second direction B by arm 32 bending with the based end in contact with the body 6a as a fulcrum.

Binding member 12 has cutout 50 at a position opposing biasing part 26, and tip end 34 is fitted into cutout 50. When tip end 34 presses binding member 12 in first direction A by the elastic deformation of arm 32, cell stack 2 is biased in first direction A. Bus bar plate 6 is biased in second direction B by the reaction force in second direction B from binding member 12.

Biasing receiver 28 is provided on separator 10. Biasing receiver 28 protrudes in vertical direction Z from opening 30 provided at a center of bus bar plate 6 in array direction X and horizontal direction Y. Biasing receiver 28 abuts on bus bar plate 6 to regulate displacement of bus bar plate 6 in second direction B and displacement of cell stack 2 in first direction A. The aspect in which biasing receiver 28 and bus bar plate 6 abut on each other is similar to that in the first exemplary embodiment. Note that binding member 12 on the side opposite to binding member 12 pressed by biasing part 26 may function as biasing receiver 28.

The exemplary embodiments of the present disclosure have been described in detail above. The above-described exemplary embodiments are merely specific examples for implementing the present disclosure. The contents of the exemplary embodiments do not limit the technical scope of the present disclosure, and many design changes such as changes, additions, and deletions of configuration elements can be made without departing from the spirit of the invention defined in the claims. Any new exemplary embodiment resulting from a change or modified example according to the designed concept offers effects of an exemplary embodiment and a modified example that are combined with the new exemplary embodiment. In the above-described exemplary embodiments, what can be changed or modified according to the designed concept is emphasized by such phrases as "of the present exemplary embodiment" and "in the present exemplary embodiment". However, contents not expressed by such phrases may also be changed or modified according to the designed concept. Discretionary combinations of configuration elements included in the exemplary embodiments are also effective as aspects of the present disclosure.

Biasing part 26 and biasing receiver 28 may be arrayed in array direction X. First direction A and second direction B may be parallel to array direction X. The modified example of the shape of biasing part 26 described in the first exemplary embodiment can also be applied to biasing part 26 of the second exemplary embodiment as long as it can exert an action of positioning cell stack 2 and bus bar plate 6. The number of cells 8 included in battery module 1 is not particularly limited. The structure of each part of battery module 1 including the shape of binding member 12 and the binding method for cell stack 2 by binding member 12 is not particularly limited.

REFERENCE MARKS IN THE DRAWINGS 1 battery module
2 cell stack
4 bus bar
6 bus bar plate
8 cell 10 separator
12 binding member
18 output terminal
22 opening
26 biasing part
28 biasing receiver
36 projection
40 plane

The invention claimed is:

1. A battery module comprising:
a cell stack in which a plurality of cells each including an output terminal are arrayed;
a bus bar that electrically connects output terminals of the plurality of cells to each other; and
a bus bar plate that covers a surface of the cell stack on which the output terminals are disposed, that includes an opening at a position overlapping with corresponding one of the output terminals, the bus bar plate in which the bus bar is disposed in the opening, wherein
when one of the bus bar plate and the cell stack is a first member and another is a second member, the first member includes a biasing part, and the second member includes a biasing receiver,
the biasing part presses the second member to bias the first member and the second member in opposite directions to each other, and the biasing receiver abuts on the first member to regulate displacement of the first member and the second member,
the bus bar plate is the first member, and the cell stack is the second member,
the cell stack includes a pair of binding members arranged to sandwich the cell stack in a direction orthogonal to an array direction of the plurality of cells and orthogonal to a direction in which the cell stack and the bus bar plate are arranged,
each binding member extends in the array direction of the plurality of cells and binds the cell stack in the array direction,
the biasing part presses one of the pair of binding members,
the bus bar plate has:
    a body that expands in the array direction and the direction in which the pair of binding members are arranged and covers the surface of the cell stack on which the output terminal is disposed; and
    the biasing part positioned at both ends in the array direction at one end of the direction in which the pair of binding members are arranged, each of the biasing part is a leaf spring having:
    an arm that extends in the array direction from the body along the surface of the cell stack on which the output terminal is disposed; and
    a tip end that is bent from the arm and extending toward the one of the pair of binding members,
each biasing part is adapted to be displaced, by the arm bending with a base end connected to the body as a fulcrum, in a first direction in which the tip end extends toward the one of the pair of binding members and in a second direction opposite to the first direction,
the one of the pair of binding members has a cutout at a position opposing the biasing part,
the tip end is fitted into the cutout,
the cell stack is biased in the first direction when the tip end presses the one of the pair of binding members in the first direction due to elastic deformation of the arm, the biasing receiver is provided in the cell stack, the biasing receiver protrudes from the opening provided in the bus bar plate in the direction in which the cell stack and the bus bar plate are arranged, and the displacement of the bus bar plate in the second direction and the displacement of the cell stack in the first direction are respectively regulated by the biasing receiver abutting an edge of the opening.

2. The battery module according to claim 1, wherein the biasing receiver includes a plane, and the plane abuts on the first member to regulate the displacement of the first member and the second member.

\* \* \* \* \*